United States Patent
Kodama et al.

(10) Patent No.: US 7,719,776 B2
(45) Date of Patent: May 18, 2010

(54) LENS UNIT, LENS BARREL, OPTICAL DEVICE, SCANNER, AND IMAGE FORMING APPARATUS

(75) Inventors: Akishige Kodama, Tokyo (JP); Shigeo Kobayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 65 days.

(21) Appl. No.: 11/668,227

(22) Filed: Jan. 29, 2007

(65) Prior Publication Data
US 2008/0037137 A1 Feb. 14, 2008

(30) Foreign Application Priority Data
Feb. 8, 2006 (JP) .............................. 2006-030546

(51) Int. Cl.
*G02B 15/14* (2006.01)
(52) U.S. Cl. .................. 359/703; 359/819; 359/821
(58) Field of Classification Search ......... 359/811–825, 359/703
See application file for complete search history.

(56) References Cited

U.S. PATENT DOCUMENTS 4,181,439 A * 1/1980 Tresch et al. ................ 356/338
6,497,507 B1 * 12/2002 Weber ......................... 362/547
6,693,751 B2 2/2004 Morii et al.
6,738,570 B2 * 5/2004 Shinohara et al. ............. 396/25
7,129,474 B2 10/2006 Kobayashi
7,531,773 B2 * 5/2009 Westerweck et al. ..... 250/201.5
2004/0105134 A1 6/2004 Morii et al.
2005/0180025 A1 * 8/2005 Orimo et al. ................. 359/694
2006/0114578 A1 6/2006 Nakajima et al.

FOREIGN PATENT DOCUMENTS

| CN | 1465051 A | 12/2003 |
|---|---|---|
| JP | 03-245112 | * 10/1991 |
| JP | 2002-221649 | 8/2002 |
| JP | 2005-37550 | 2/2005 |

* cited by examiner

*Primary Examiner*—Timothy J Thompson
(74) *Attorney, Agent, or Firm*—Oblon, Spivak, McClelland, Maier & Neustadt, L.L.P.

(57) ABSTRACT

A lens barrel includes a communicating passage that communicates between a space inside the lens barrel and outside of the lens barrel. The communicating passage includes a through hole, a circumferential groove, and a vertical groove. Light from outside the lens barrel is prevented from entering an effective optical range of a lens through the communicating passage. A partition is arranged between the effective optical range and a non-light-transmitting range. A surface of a portion outside the effective optical range is formed of a light-absorbing material, so that light is prevented from directly entering the lens through the communicating passage.

21 Claims, 9 Drawing Sheets

LENS UNIT, LENS BARREL, OPTICAL DEVICE, SCANNER, AND IMAGE FORMING APPARATUS

CROSS-REFERENCE TO RELATED APPLICATIONS

The present document incorporates by reference the entire contents of Japanese priority document, 2006-030546 filed in Japan on Feb. 8, 2006.

BACKGROUND OF THE INVENTION

1. Field of the Invention

The present invention relates to a lens unit, a lens barrel for use in the lens unit, and an optical device, a scanner, and an image forming apparatus using the lens unit.

2. Description of the Related Art

Lens units having a plurality of lenses in a lens barrel have been used in various optical devices. In such a lens unit, a space between, the lenses is hermetically-sealed by the lens barrel. If this space is hermetically-sealed, when the temperature or humidity of the use environment of this lens unit is changed, air in this space expands or contracts to exert an external pressure on the lenses, resulting in, for example, deterioration of surface accuracy of an effective optical range. Moreover, when the temperature of the use environment is decreased, moisture in this space is saturated, thereby causing condensation on the surface of the lens on the space side, which is likely to influence optical performance.

In recent years, demand for high-accuracy and inexpensive lenses for scanners has been increasing. For example, when objective lenses for a scanner have a space interposed therebetween, problems such as deterioration in surface accuracy of the lenses and condensation as explained above are not negligible.

To overcome the problems, Japanese Patent Application Laid-Open No. 2002-221649 discloses a lens unit in which a communicating passage is provided between a space between a plurality of lenses and outside air.

However, in the conventional lens unit, although the space between the lenses is successfully released from a hermetically-sealed state, light from outside the lens barrel enters the effective optical range of the lenses through a communicating passage. When external light enters the effective optical range, the external light is diffused on the lens surface, thereby causing a phenomenon, such as flare, on an image formation plane. This causes deterioration of optical characteristics. Moreover, to prevent entrance of the external light, the sire of the lens barrel is necessitated to increase, resulting in an increase in the sue of the optical devices.

SUMMARY OF THE INVENTION

It is an object of the present invention to at least partially solve the problems in the conventional technology.

According to an aspect of the present invention, a lens unit includes a lens barrel that accommodates a plurality of lenses, and a communicating passage that communicates between a space between the lenses and outside of the lens barrel, and is arranged in the lens barrel such that light from outside the lens barrel does not enter an effective optical range of the lenses through the communicating passage.

According to another aspect of the present invention, a lens unit includes a lens barrel that accommodates a plurality of lenses, and a communicating passage that communicates between a space between the lenses and outside of the lens barrel, and is arranged in the lens barrel such that light from outside the lens barrel does not enter the lenses through the communicating passage.

According to still another aspect of the present invention, a lens barrel includes a plurality of lenses, and a communicating passage that communicates between a space between the lenses and outside of the lens barrel, and is bent.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below with reference to the accompanying drawings.

Figure 8:
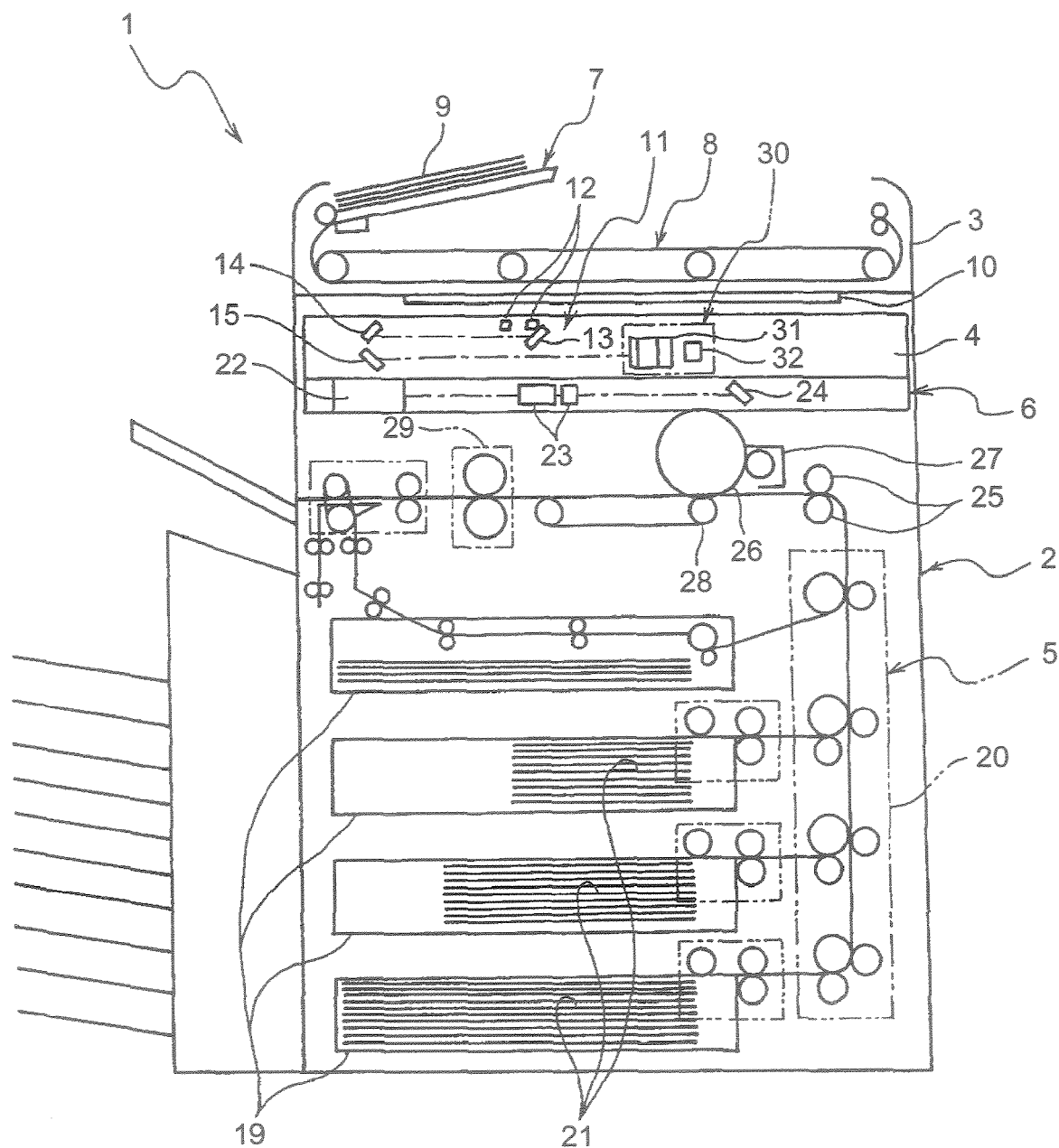
FIG. 8 is a schematic of an image forming apparatus according to an embodiment of the present invention.

FIG. 8 is a schematic of an image forming apparatus 1 according to an embodiment of the present invention. The image forming apparatus 1 includes a main frame 2, an automatic document feeder 3, a scanning unit 4, a paper feeding unit 5, and a writing unit 6. The main frame 2 is formed in, for example, a box shape and is placed on a floor or the like. The main frame 2 accommodates therein the scanning unit 4, the paper feeding unit 5, and the writing unit 6.

The automatic document feeder 3 is arranged on an upper side of the main frame 2. The automatic document feeder 3 includes a sheet tray 7 and a conveyor belt 8. The sheet tray 7 is flat and is arranged on an upper side of the main frame 2, on which a plurality of originals 9 is placed. The conveyor belt 8 conveys the originals 9 on the sheet tray 7 one by one onto a contact glass 10, explained later, and delivers an original whose image has been read by an image reading unit 16, explained later, from the surface of the contact glass 10 to outside the main frame 2.

The scanning unit 4 is provided on an upper side of the main frame 2 and under the automatic document feeder 3. The scanning unit 4 includes the contact glass 10 and an optical scanning system 11. The contact glass 10 is arranged on the upper surface of the main frame 2 such that both surfaces of the contact glass 10 are parallel to the horizontal direction. The optical scanning system 11 includes an exposure lamp 12, a first mirror 13, a second mirror 14, a third mirror 15, and the image reading unit 16.

The exposure lamp 12 irradiates the original 9 on the contact glass 10 with light. The first mirror 13, the second mirror 14, and the third mirror 15 guide a reflected image from the original 9 to the image reading unit 16. The exposure lamp 12 and the first mirror 13 are fixed onto a first carriage (not shown), while the second mirror 14 and the third mirror 15 are fixed onto a second carriage (not shown). At the time of reading an original, the first carriage and the second carriage are mechanically moved at a relative speed of 2 to 1 so as not to change an optical path length. These first and second carriages of the optical scanning system 11 are moved by a scanner driving motor (not shown).

The image reading unit 16 includes an image forming lens system 31, and an image sensor 32. The detailed configuration of the image reading unit 16 is explained later. The image reading unit 16 reads the reflected image of an original by the image sensor 32, and converts an optical signal to an electrical signal. The electrical signal is output to an image processing unit (not shown). When the image forming lens system 31 and the charge-coupled device (CCD) image sensor 32 are moved in a right-left direction (horizontal direction) in FIG. 8, an image magnification can be changed. That is, the positions of the image forming lens system 31 and the CCD image sensor 32 in the horizontal direction in FIG. 8 are set correspondingly to a specified magnification.

The paper feeding unit 5 includes a plurality of transfer paper cassettes 19 on a lower side of the main frame 2, and a transfer-paper feeding unit 20. The transfer paper cassettes 19 each have a plurality of transfer sheets 21 accommodated therein. The transfer-paper feeding unit 20 feeds the transfer sheets 21 in the transfer paper cassettes 19 to a gap between resist rollers 25. The paper feeding unit 5 feeds the transfer sheets 21 accommodated in the transfer paper cassettes 19 one by one to the gap between the resist rollers 25, that is, toward the writing unit 6.

The writing unit 6 includes a laser output unit 22, image forming lenses 23, a mirror 24, the resist rollers 25, a photosensitive drum 26, a developing device 27, a transfer member 28, and a fixing device 29.

The laser output unit 22 has provided therein a laser diode, which is a laser light source, and a polygon mirror that is rotated at high constant speed by a motor. Laser light emitted from the laser output unit 22 is deflected by the polygon mirror that is rotated at constant speed to pass through the image forming lenses 23, is folded by the mirror 24, and is then gathered on an outer circumference surface of the photosensitive drum 26 to form an image. With the deflected laser light, exposure scanning is performed in a so-called main scanning direction orthogonal to a direction in which the photosensitive drum 26 is rotated, thereby recording, line by line, an image signal output from an image processing unit (not shown). Then, the writing unit 6 repeats main scanning in predetermined cycles corresponding to the rotation speed and recording density of the photosensitive drum 26, thereby forming an image, that is, an electrostatic latent image, on the outer circumference surface of the photosensitive drum 26.

As such, the photosensitive drum 26 of an image forming system is irradiated with the laser light output from the writing unit 6. At a laser-light radiation position near one end of the photosensitive drum 26 is arranged a beam sensor (not shown) which generates a main-scanning synchronizing signal. Based on a main-scanning synchronizing signal output from this beam sensor, image recording timing in a main scanning direction is controlled, and a control signal for input and output of an image signal, explained later, is generated.

The resist rollers 25 feed the transfer sheet 21 fed from any of the transfer paper cassettes 19 from the transfer-paper feeding unit 20 to a gap between the transfer member 28 and the photosensitive drum 26. The photosensitive drum 26 is formed in a column or cylindrical shape rotatable about its axial core. The photosensitive drum 26 has developed thereon the carried electrostatic latent image formed by the laser output unit 22, and transfers the thus obtained toner image to the transfer sheet 21 positioned between the photosensitive drum and the transfer member 28.

The developing device 27 attaches toner to the outer circumference surface of the photosensitive drum 26 to develop an electrostatic latent image on the outer circumference surface of the photosensitive drum 26. The transfer member 28 presses the transfer sheet 21 onto the outer circumference surface of the photosensitive drum 26 to transfer the toner on the outer circumference surface of the photosensitive drum 26 onto the transfer sheet 21, and also feeds the transfer sheet 21 toward the fixing device 29. The fixing device 29 fixes the toner image formed on the photosensitive drum 26 or the like to the transfer sheet 21, and delivers the transfer sheet 21 to the outside the main frame 2.

Figure 9:
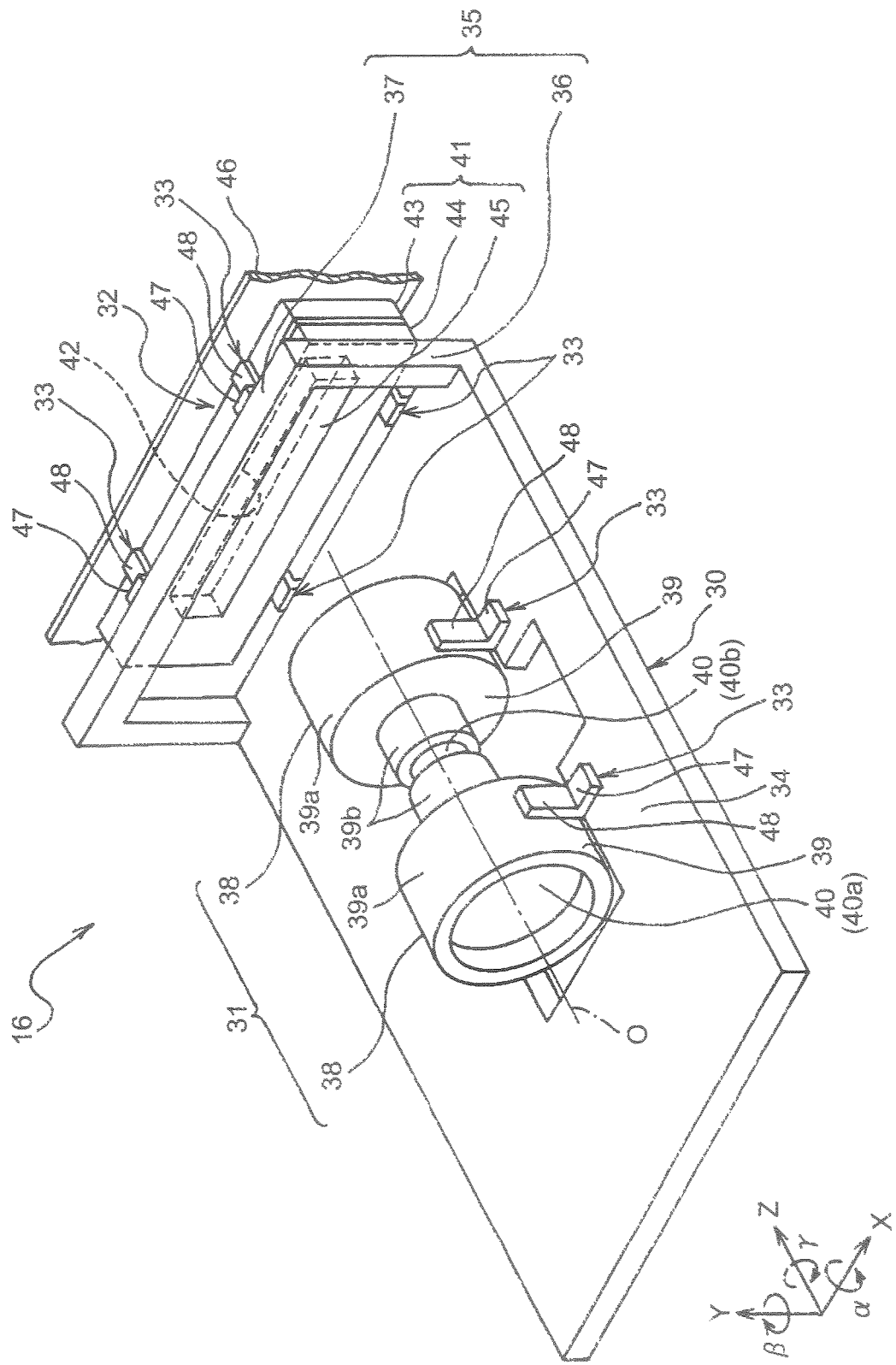
FIG. 9 is a schematic of an image reading unit according to an embodiment of the present invention.

FIG. 9 is a schematic of an image reading unit according to an embodiment of the present invention. The image reading unit 16 includes a base member 30, the image forming lens system 31, the image sensor 32, and a plurality of intermediate supporting members 33.

The base member 30 includes a flat-plate portion 34 in a rectangle shape arranged so that both surfaces are parallel to the horizontal direction, and a standing portion 35 that stands from the flat-plate portion 34. The flat plate portion 34, i.e., the base member 30, is movable along the horizontal direction in FIG. 8. The longitudinal direction of the flat-plate portion 34 is parallel to the horizontal direction in FIG. 8.

The standing portion 35 stands from one end in the horizontal direction in FIG. 8, i.e., from one end in the longitudinal direction of the flat-plate portion 34. The standing portion 35 includes a pair of standing columns 36 that stand from both sides in a width direction of the flat-plate portion 34 and a connecting column 37 connecting ends of these standing columns 36 on a side away from the flat-plate portion 34, thereby being formed in a frame shape.

The image forming lens system 31 includes two lens units 38. The lens units 38 are formed separately from each other. The lens units 38 each include a lens barrel 39 and a lens 40 accommodated in the lens barrel 39.

The lens barrel 39 is made of synthetic resin, and is molded through well-known injection molding, for example. The lens barrel 39 includes, as shown in FIGS. 1A to 7, a large diameter portion 39a and a small diameter portion 39b integrally. The large diameter portion 39a and the small diameter portion 39b each have an outer shape formed in a predetermined cylindrical shape in an axial center direction of an optical axis O. The small diameter portion 39b is connected to the end of the large diameter portion 39a, and has inner and outer diameters smaller than those of the large diameter portion 39a. The large diameter portion 39a and the small diameter portion 39b are each formed in an axially symmetrical shape other than their internal configuration regarding to the axial center, and are provided on the same axis. In the large diameter portion 39a and the small diameter portion 39b of the lens barrel 39, the lens 40 is press-fitted. Hereinafter, to distinguish between the lens 40 in the large diameter portion 39a and that in the small diameter portion 39b, the lens 40 in the large diameter portion 39a is denoted by the reference numeral 40a, while the lens 40 in the small diameter portion 39b is denoted by the reference numeral 40b.

The intermediate supporting members 33 are made of, for example, synthetic resin that allows transparent light to pass through, and each integrally include a first attachment portion 47 and a second attachment portion 46. The first attachment portion 47 and the second attachment portion 48 are formed in a flat-plate shape. From an edge of the first attachment portion 47, the second attachment portion 48 stands. The angle formed between the first attachment portion 47 and the second attachment portion 48 is 90 degrees in the depicted example.

In each of the intermediate supporting members 33, the first attachment portion 47 is placed on the base member 30, while the second mounding portion 48 is placed on the lens barrel 39 and a package 41 of the image sensor 32. For example, a light cure adhesive fills in between the first attachment portion 47 and the base member 30, between the second attachment portion 48 and the lens barrel 39, and the package 41 of the image sensor 32. This adhesive cures when light, such as ultraviolet light, is applied thereto. With this, the lens barrel 39, i.e., the image forming lens system 31, and the package 41, i.e., the image sensor 32, are mounted on the base member 30. When mounted on the base member 30, the image forming lens system 31 and the image sensor 32 are aligned such chat their optical axes O (represented by a one-dot-chain line in FIG. 9) are coaxial.

The two lens units 38 are arranged so that their optical axes are coaxial. The lens barrel 39, i.e., the lens units 38, are mounted on the flat-plate portion 34 of the base member 30 via the intermediate supporting members 33. The image forming lens system 31, i.e., the image reading unit 16, forms an image on a linear photoelectric transducer 42 of the image sensor 32.

The image sensor 32 includes the package 41 and the linear photoelectric transducer 42 as an optical-electrical converting element. The package 41 includes a base 43 made of ceramics, a window frame 44 made of ceramics, and a sealing glass 45. The base 43 is formed in a flat-plate shape, and has formed thereon the linear photoelectric transducer 42. The window frame 44 is formed in a frame shape, and is fixed to the base 43 with an adhesive so as to be placed on an outer edge of the base 43. The sealing glass 45 is formed in a flat-plate shape, and is fixed to the window frame 44 with an adhesive so that an outer edge portion is placed, on the window frame 44. The package 41 covers the linear photoelectric transducer 42 with the base 43, the window frame 44, and the sealing glass 45. Also, the package 41 is mounted on a printed circuit board 46 or the like.

The linear photoelectric transducer 42 is configured in a manner such that Photo Diodes (PDs), which are optical electrical-converting elements, and CCDs, which are charge conveying elements, are aligned on a straight line. The longitudinal direction of the linear photoelectric transducer 42 is parallel to the main scanning direction.

Also, the image sensor 32 includes electrodes and lead wires provided to the package 41 for electrically connecting a conductive pattern of the printed circuit board 46 and the electrodes of the linear photoelectric transducer 42. The image sensor 32 is attached to the standing portion 35 of the base member 30 via the intermediate supporting members 33 such that the sealing glass 45 faces the image forming lens system 31 through the standing portion 35.

Figure 1A:
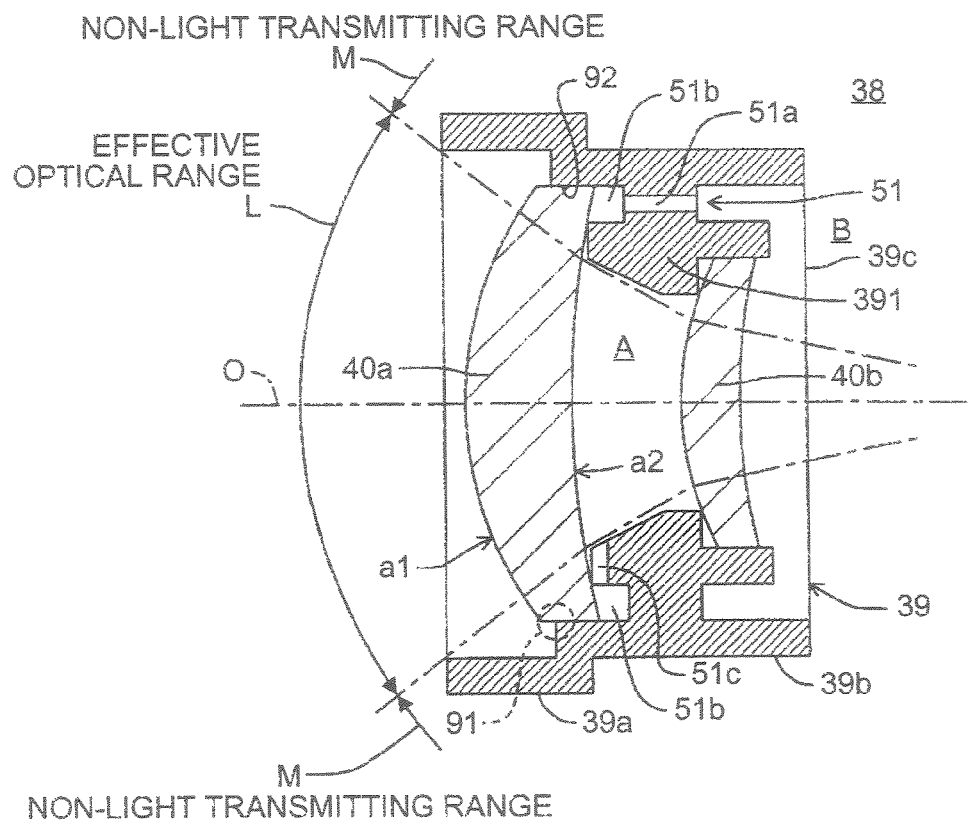
FIG. 1A is a side cross-section of a relevant part of a lens unit according to first and second embodiments of the present invention.

Next, referring to FIGS. 1A to 7, embodiments of the lens unit 38 are explained. Like reference numerals refer to corresponding components throughout the drawings. Also, a figure numbered with a suffix A is a cross section Taken along line P-P in a figure identically numbered with a suffix B. FIG. 1A is a side cross-section of a relevant part of the lens unit 38 according to first and second embodiments of the present invention. FIG. 1B is a front view of the lens barrel 39 according to the first and second embodiments. As shown in FIGS. 1A and 1B, the lens 40a is arranged inside the large diameter portion 39a of the lens barrel 39, while the lens 40b is arranged inside the small diameter portion 39b of the lens barrel 39. The lens 40a has a lens surface al in contact with a positioning protrusion 91, thereby positioning a direction of the optical axis O (Z direction). Also, the lens 40a has a side surface in contact with an XY positioning portion 92 in the lens barrel 39, thereby positioning a direction perpendicular to the optical axis O (XY direction). The lens 40a is fixed inside the lens barrel 39 through press-fitting or bonding. Positioning and fixing schemes applied to the lens 40b are similar to those applied to the lens 40a, With this, in the lens barrel 39, a space A between the lenses 40a and 40b is formed.

Figure 1B:
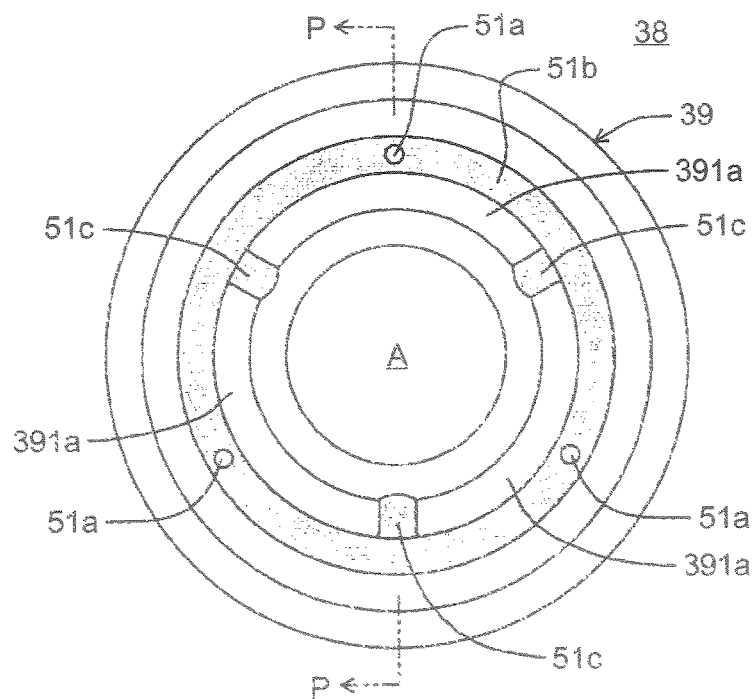
FIG. 1B is a front view of a lens barrel shown in FIG. 1A.

On the inner circumference surface of the small diameter portion 39b of the lens barrel 39, a ring-shaped spacer portion 391 defining a space between the lens surface a2 of the lens 40a and a lens surface b1 of the lens 40b is formed. Through the spacer portion 391, a communicating passage 51 that communicates between the space A and a lens-barrel outside portion B. The communicating passage 51 includes through holes 51a penetrating through the spacer portion 391 from an opening 39c side of the small diameter portion 39b in parallel to the axis O, a circumferential groove 51b formed in a ring shape at a portion abutting on the lens surface a2 of the lens 40a in the spacer portion 391, and vertical grooves 51c connecting from the circumferential groove 51b to a space A side. As shown in FIG. 1B, the through holes 51a open at the circumferential groove 51b and are formed at three positions 120 degrees away from each other around the circumference. The vertical grooves 51c are formed at three positions 120 degrees array from each other between two through holes 51a. In FIG. 1B, the circumferential groove 51b and the vertical grooves 51c are depicted as hatched. With this configuration, the communicating passage 51 connects air in the space A and outside air in the lens-barrel outside portion B via the vertical grooves 51c, the circumferential groove 51b, and the through holes 51a.

The lenses 40a and 40b include an effective optical range L where light corresponding to a reflected image from the original 9 passes through, and a non-light-transmitting range M (outside the effective optical range) where light corresponding to a reflected image from the original 9 does not pass through. This effective optical range L of the lenses 40a and 40b is a portion near center of the surface of the lenses 40a and 40b, while the non-light-transmitting ranges M of the lenses 40a and 40b are portions near outer edges of the lenses 40a and 40b. The communicating passage 51 is provided at a position that light from the lens-barrel outside portion B of the lens barrel 39 does not directly enter the effective optical range L. That is, the light entering the communicating passage 51 from the lens-barrel outside portion B is light entering the through holes 51a from the opening 39c side of the small diameter portion 39b, and the light passing through the through holes 51a can enter only the non-light-transmitting ranges M of the lens surface a2 of the lens 40a (outside the effective optical range).

In this manner, light from the lens-barrel outside portion B is prevented from entering the effective optical range L of the lens 40a through the communicating passage 51. Also, light from the lens-barrel outside portion B can enter outside the effective optical range L of the lens 40a through the communicating passage 51 but is prevented from entering inside the effective optical range L. With this, light from the lens-barrel outside portion B is prevented from entering inside the effective optical range L of the lens surface a2, which prevents an influence of flare or the like.

Also, portions abutting on the lens surface a2 of the lens 40 of the spacer portion 301 are circular-arc-shaped convex portions 391a each serving as a partition between the vertical grooves 51c as shown in FIG. 1B. The convex portions 391a make contact with an outer circumference edge portion of the effective optical range L of the lens 40a. In this manner, a partition (convex portion 391a) is provided between inside and outside the effective optical range L of the lens 40a. With this, light from One lens-barrel outside portion B is further prevented from entering the effective optical range L of the lens surface a2, which prevents an influence of flare or the like.

Figure 7:
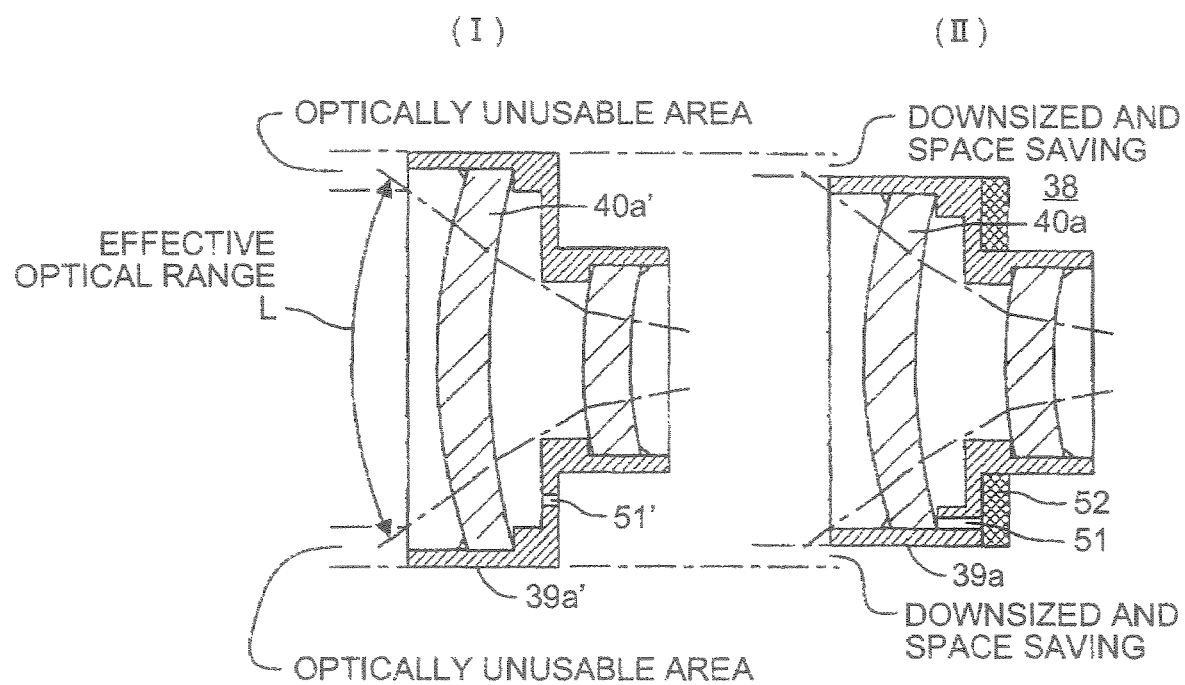
FIG. 7 is a schematic for explaining an example of downsizing and space-saving in the lens unit according to the embodiments.

Further, the communicating passage 51 is provided at a position where light from the lens-barrel outside portion B does not enter the effective optical range L of the lens 40a, i.e., near the outer circumference of the large diameter portion 39a. Therefore, downsizing and space-saving of the lens unit 38 can be achieved. For example, a configuration depicted in (II) of FIG. 7 is similar to that according to the embodiment explained above. If a communicating passage 51' is formed at a center side of a large diameter portion 39a', as shown in (I) of FIG. 7, to prevent light from the lens-barrel outside portion B from passing through the communicating passage 51' to enter inside an effective optical range L' of the lens 40a, an optically unusable area has to be increased, resulting in an increase in lens diameter. However, in the embodiment depicted in (II) similar to the first embodiment, the communicating passage 51 is provided near the outer circumference of the large diameter portion 39a. Therefore, the optically unusable area is small, and downsizing and space-saving of the lens unit 38 can be achieved. In the embodiment, a filter member 52 is arranged that allows air to pass through but prevents light from passing through.

According to the second embodiment, in the lens unit 38 of FIGS. 1A and 1B, although not shown, the lens surface a2 of the lens 40a can be subjected to some process. For example, a light-absorbing material (for example, black or matt coating, etc.) is provided on the surface outside the effective optical range L of the lens surface a2, With thus, light from the lens-barrel outside portion B is completely prevented from entering even outside the effective optical range L of the lens surface a2 through the communicating passage 51, which prevents an influence of flare or the like.

Figure 2A:
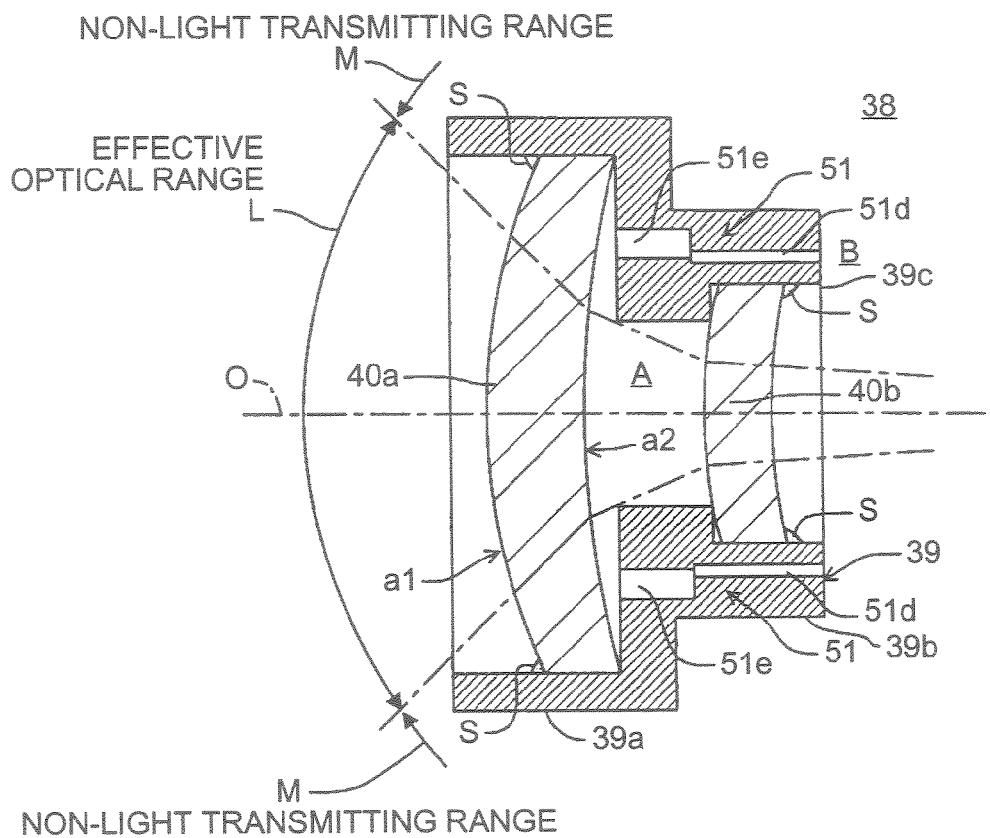
FIG. 2A is a side cross-section of a relevant part of a lens unit according to a third embodiment of the present invention.
Figure 2B:
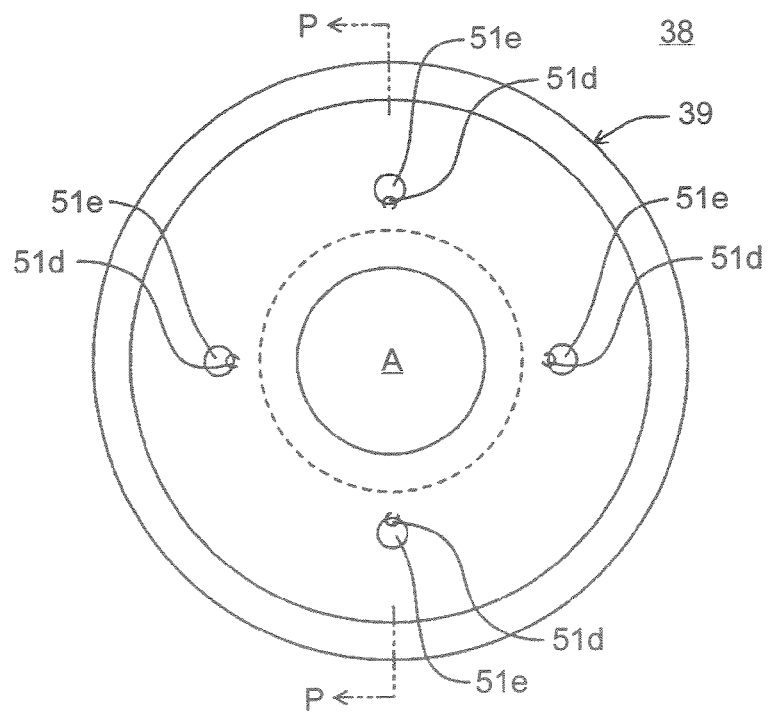
FIG. 2B is a front view of a lens barrel shown in FIG. 2A.

FIG. 2A is a side cross-section of a relevant part of the lens unit 38 according to a third embodiment. FIG. 2B is a front view of the lens barrel 39 according to the third, embodiment. As shown in FIGS. 2A and 2B, the lens 40a is arranged inside the large diameter portion 39a, while the lens 40b is arranged inside the small diameter portion 39b. The lenses 40a and 40b are fixed with an adhesive S to inner circumference surfaces of the large diameter portion 39a and the small diameter portion 39b, respectively. In the small diameter portion 33b of the lens barrel 39, the communicating passage 51 communicating between the space A and the lens-barrel outside portion B is formed. The communicating passage 51 includes small through holes 51d and large through holes 51e penetrating through the small diameter portion 39b in parallel to the axis O, with the through holes 1id being smaller in diameter than the through holes 51e and both of the through holes 51d and 51e being decentered in a radius direction of the small diameter portion 39b, As shown in FIG. 2B, the through holes 51d and 51e (communicating passage 51) are formed herein at four positions 90 degrees away from each other around the circumference. With this configuration, the communicating passage 51 connects air in the space A and outside air in the lens-barrel outside portion B via the through holes 51e and 51d.

According to the third embodiment, the communicating passage 51 is also provided at a position where light from the lens-barrel outside portion B of the lens barrel 39 does not directly enter the effective optical range M of the lens 40a. Besides, light entering the through holes 51d from the opening 39c of the small diameter portion 39b can enter only the non-light-transmitting ranges M (outside the effective optical range) on the lens surface a2 of the lens 40a. That is, light from the lens-barrel outside portion B is prevented from entering inside the effective optical range L of the lens surface a2, which prevents an influence of flare or the like.

Figure 3A:
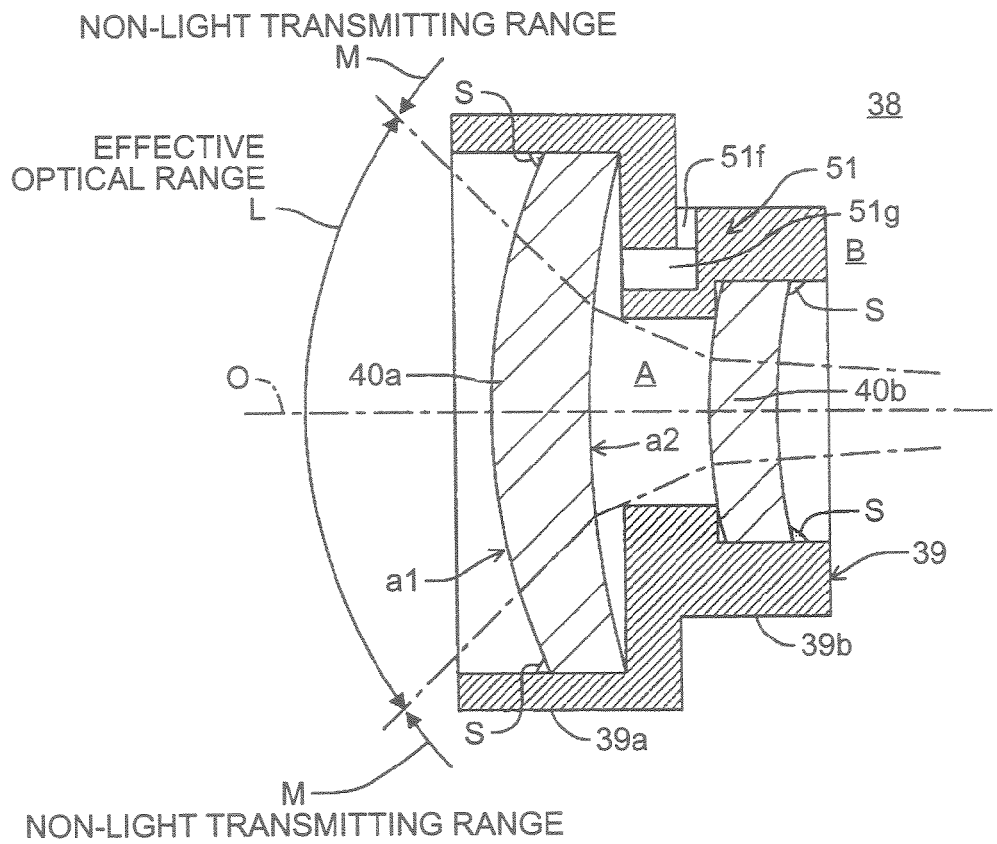
FIG. 3A is a side cross-section of a relevant part of a lens unit according to a fourth embodiment of the present invention.
Figure 3B:
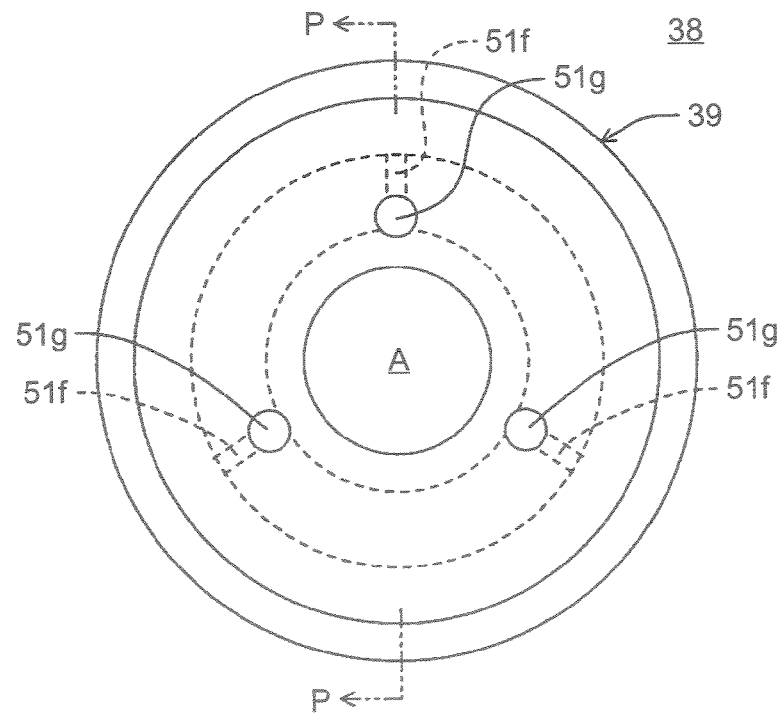
FIG. 3B is a front view of a lens barrel shown in FIG. 3A.

FIG. 3A is a side cross-section of a relevant part of the lens unit 38 according to a fourth embodiment. FIG. 3B is a front view of the lens barrel 39 according to the fourth embodiment. As shown in FIGS. 3A and 3B, the communicating passage 51 communicating between the space A and the lens-barrel outside portion B is formed at a connecting portion between the large diameter portion 39a and the small diameter portion 39b of the lens barrel 39. The communicating passage 51 includes through holes 51f penetrating from a base of an end of the small diameter portion 39b on the large diameter portion 39a side in a direction forming a right angle with the axis O, and through holes 51g each penetrating through from a relevant one of the through holes 51f to the lens 40a side in parallel to the axis O. As shown in FIG. 3B, the through holes 51g and 51f (communicating passage 51) are formed at three positions 120 degrees away from each other around the circumference. With this configuration, the communicating passage 51 connects air in the space A and outside air in the lens-barrel outside portion B via the through holes 51g and 51f.

According to the fourth embodiment, the communicating passage 51 is in a flexed shape with both of the through holes 51f and 51d crossing at a right angle. Therefore, light from the lens-barrel outside portion B does not enter the effective optical range L of the lens 40a, which prevents an influence of flare or the like. Also, irrespectively of inside or outside the effective optical range L of the lens 40a, light does not enter the lens 40a itself. In the lens barrel 39 of the fourth embodiment, the communicating passage 51 is a flexed shape.

Figure 4A:
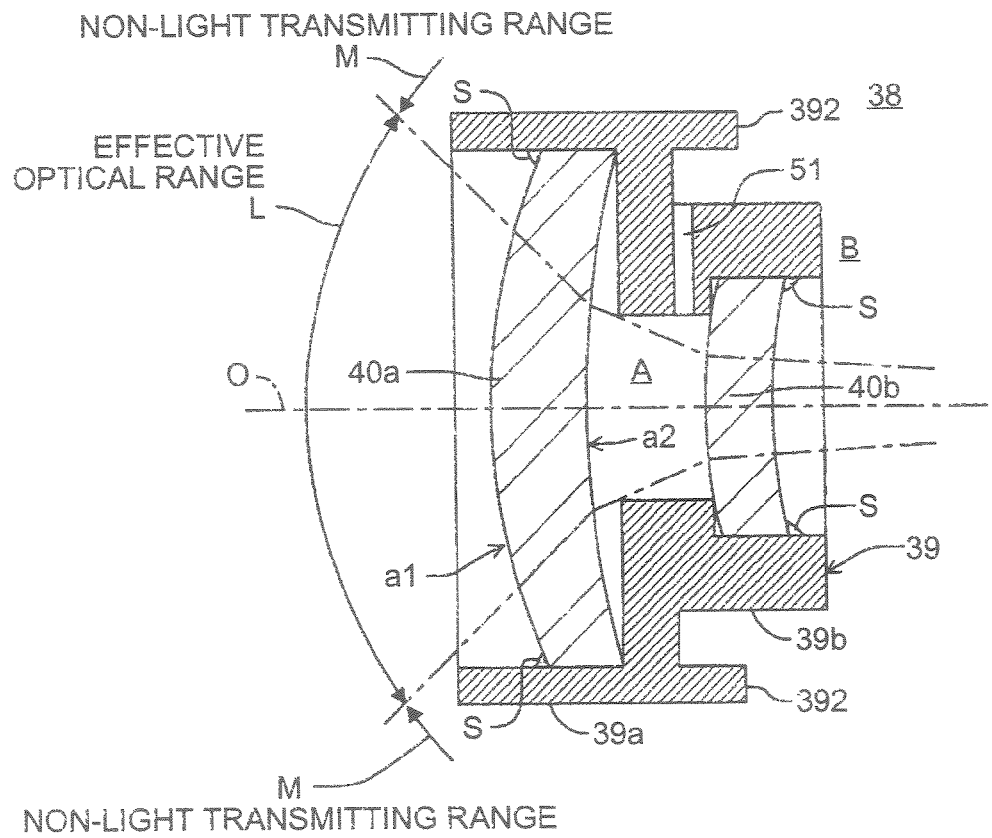
FIG. 4A is a side cross-section of a relevant part of a lens unit according to a fifth embodiment of the present invention.
Figure 4B:
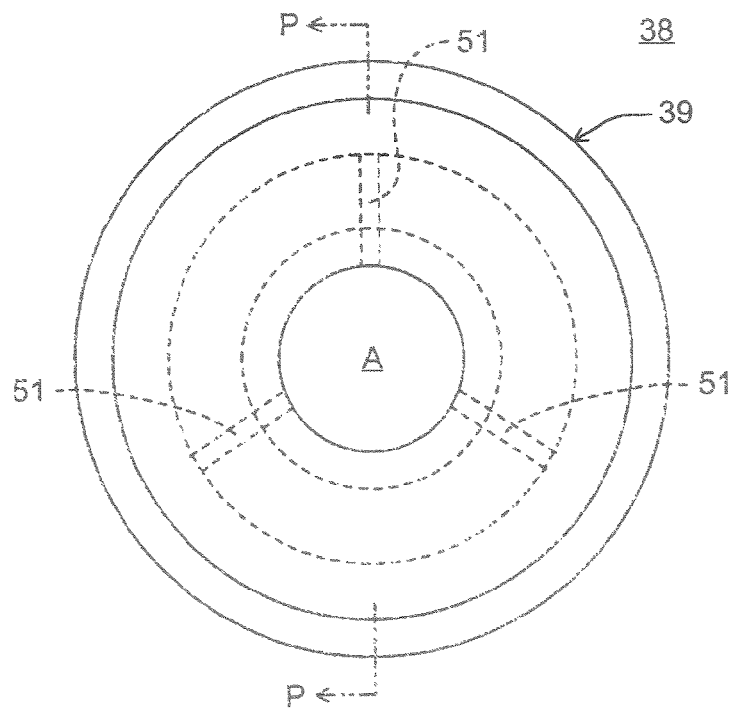
FIG. 4B is a front view of a lens barrel shown in FIG. 4A.

FIG. 4A is a side cross-section of a relevant part of the lens unit 38 according to a fifth embodiment. FIG. 4B is a front view of the lens barrel 39 according to the fifth embodiment. As shown in FIGS. 4A and 4B, the communicating passages 51 communicating between the space A and the lens-barrel outside portion B are formed at a connecting portion between the large diameter portion 39a and the small diameter portion 39b of she lens barrel 39. The communicating passages 51 include through holes penetrating from a base of an end of the small diameter portion 39b on the large diameter portion 39a side in a direction forming a right angle with the axis O. As shown in FIG. 4B, the communicating passages 51 are formed at three positions 120 degrees away from each other around the circumference. Also, around an end of the large diameter portion 39a on the small diameter portion 39b side, a light-shielding wall 392 is formed so as to cover the small diameter portion 39b and the communicating passages 51. With this configuration, the communicating passages 51 connect air in the space A and outside air in the lens-barrel outside portion B.

According to the fifth embodiment, since the outer circumference side of the communicating passages 51 is covered with the light-shielding wall 392, light from the lens-barrel outside portion B of the lens barrel 39 does not enter inside the communicating passages 51 and the effective optical range L of the lens 40a. In addition, since each communicating passage 51 forms a right angle with the axis O, even if light enters the communicating passage 51, this light does not enter the effective optical range L of the lens 40a or even the lens 40a itself, which prevents an influence of flare or the like. That is, irrespectively of inside or outside the effective optical range L of the lens 40a, light does not enter the lens 40a itself.

Figure 5A:
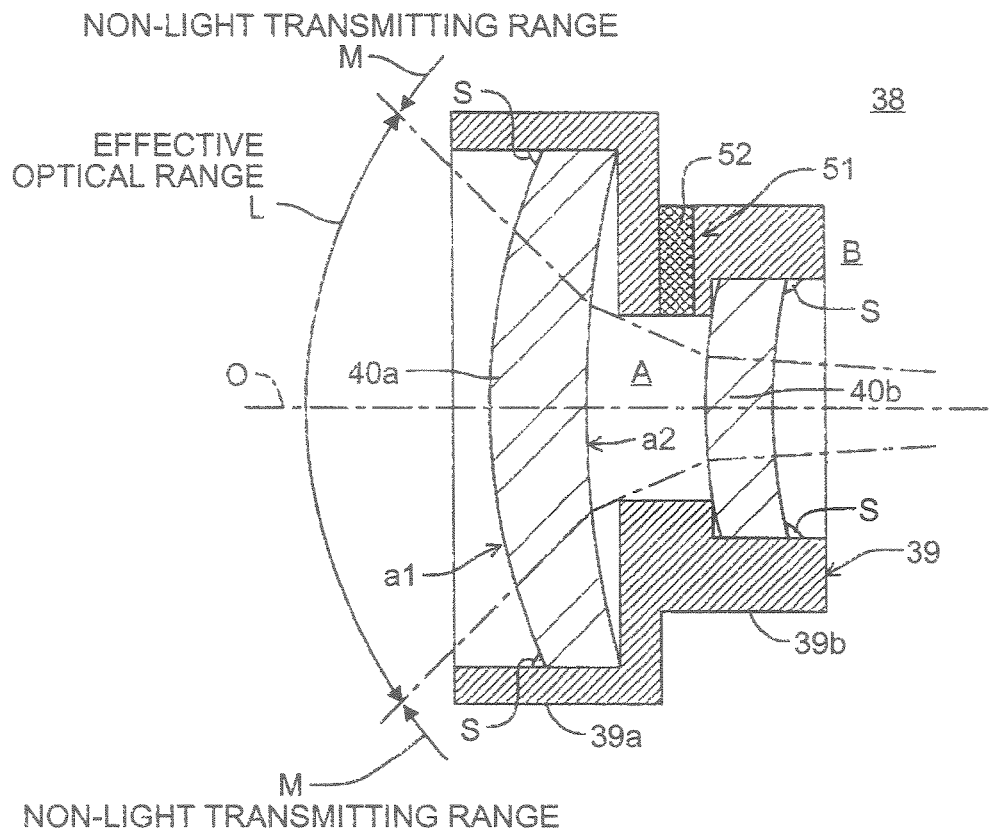
FIG. 5A is a side cross-section of a relevant part of a lens unit according to a sixth embodiment of the present invention.
Figure 5B:
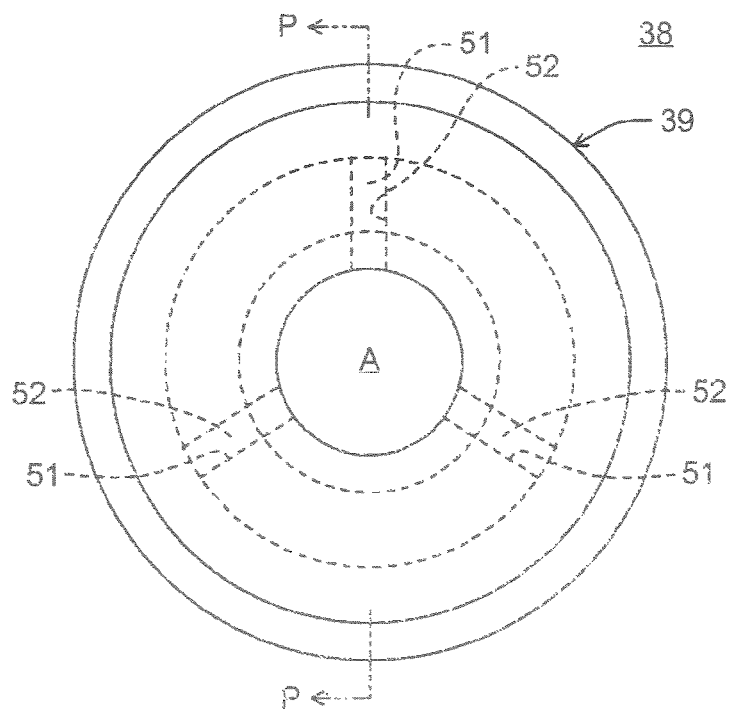
FIG. 5B is a front view of a lens barrel shown in FIG. 5A.

FIG. 5A is a side cross-section of a relevant part of the lens unit 38 according to a sixth embodiment. FIG. 5B is a front view of the lens barrel 39 according to the sixth embodiment. As shown in FIGS. 5A and 5B, the communicating passages 51 communicating between the space A and the lens-barrel outside portion B are formed at a connecting portion between the large diameter portion 39a and the small diameter portion 39b of the lens barrel 39. The communicating passages 51 include through holes penetrating from a base of an end of the small diameter portion 39b on the large diameter portion 39a side in a direction forming a right angle with the axis O. As shown in FIG. 5B, the communicating passages 51 are formed at three positions 120 degrees away from each other around the circumference. Also, the filter member 52, such as a sponge, fills in each of the communicating passages 51, the filter member allowing air to pass through but prevents light from passing through. That is, the communicating passage 51 connects air in the space A and outside air in the lens-barrel outside portion B via the filter member 52, According to the sixth embodiment, since the filter member 52 that prevents light from passing through is provided, light from the lens-barrel outside portion B does not enter the effective optical range L of the lens 40a from any of the communicating passages 51, which prevents an influence of flare or the like.

Figure 6A:
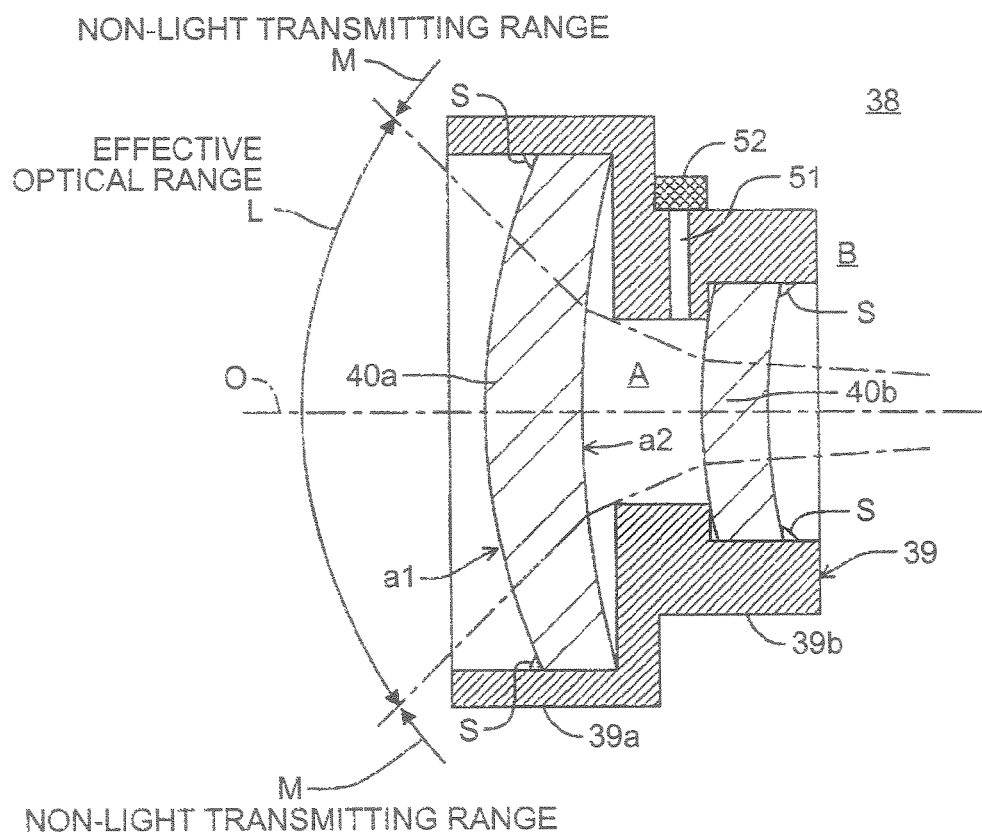
FIG. 6A a is a side cross-section of a relevant part of a lens unit according to a seventh embodiment of the present invention.
Figure 6B:
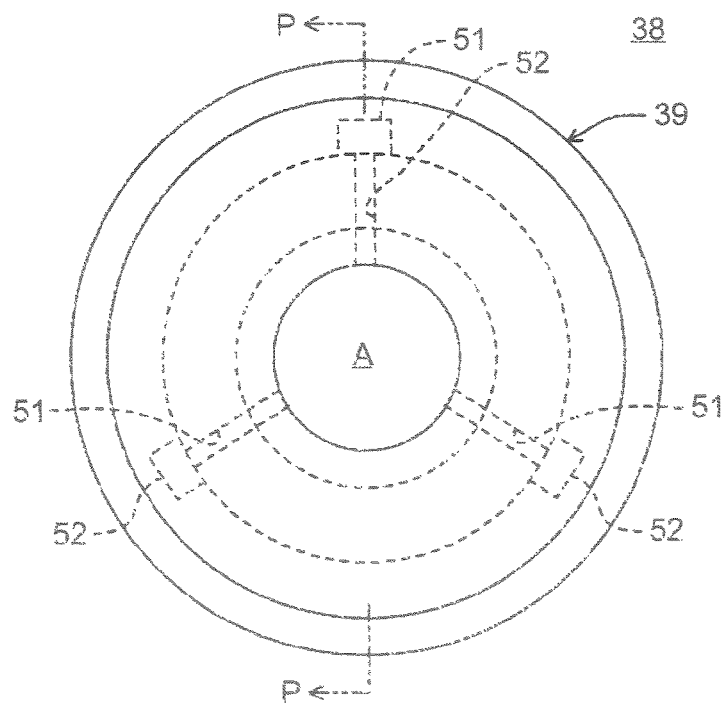
FIG. 6B is a front view of a lens barrel shown in FIG. 6A.

FIG. 6A is a side cross-section of a relevant part of the lens unit 38 according to a seventh embodiment. FIG. 6B is a front view of the lens barrel 39 according to the seventh embodiment. As shown in FIGS. 6A and 6B, the communicating passages 51 communicating between the space A and the lens-barrel outside portion B are formed at a connecting portion between the large diameter portion 39a and the small diameter portion 39b of the lens barrel 39. The communicating passages 51 include through holes penetrating from a base of an end of the small diameter portion 39b on the large diameter portion 39a side in a direction forming a right angle with the axis O. As shown in FIG. 6B, the communicating passages 51 are formed at three positions 120 degrees away from each other around the circumference. Also, at an edge portion on an outer circumference side of each of the communicating passages 51, the filter member 52, such as a sponge, that allows air to pass through but prevents light from passing through is mounted. That is, the communicating passage 51 connects air in the space A and outside air in the lens-barrel outside portion B via the filter member 52.

According to the seventh embodiment, the filter member 52 that prevents light from passing through is also provided, and light from the lens-barrel outside portion B of the lens barrel 30 does not enter the effective optical range L of the lens 40a from any of the communicating passages 51. Thus, it is possible to prevent an influence of flare or the like.

According to an eighth embodiment, in the lens unit 38 shown in FIGS. 1A to 2B, although not shown, the inner circumference of the communicating passage 51 is formed of a light-absorbing material that hardly likely reflects light (for example, black or matt coating, etc.). In this case, as explained above, the shape is such that light from the lens-barrel outside portion B is prevented from entering the effective optical range L of the lens 40a through any of the communicating passages 51, but a subtle amount of light diffused outside the effective optical range L may enter inside the effective optical range L of the lens 40a to have an influence thereon. According to the embodiment, such an influence, however, can be further reduced.

The lens unit 38 according to the first to eighth embodiments or the lens barrel 39 according to the fourth embodiment can be used for an optical device, such as a camera, a video camera, or a mobile phone with camera. With such an optical device, high image quality can be achieved without an influence of flare or the like.

As explained above, the lens unit 38 according to the first to eighth embodiments or the lens barrel 39 according to the fourth embodiment can be used for the image reading unit 16 shown in FIGS. 8 and 9. With the image reading unit 16, high image quality can be achieved without an influence of flare or the like.

The lens unit 38 according to the first to eighth embodiments or the lens barrel 39 according to the fourth embodiment can be used for a scanner. In this case, main part of the scanner has a configuration similar to that of the scanning unit 4, for example, shown in FIG. 8. With such a scanner, high image quality can be achieved without an influence of flare or the like.

The image forming apparatus shown in FIG. 8 uses the image reading unit 16 that includes the lens units 38 according to the first to eighth embodiments or the lens barrel 39 according to the fourth embodiment. With this image forming apparatus, high image quality can be achieved without an influence of flare or the like.

As set forth hereinabove, according to an embodiment of the present invention, even if there is a space between a plurality of lenses, surface accuracy of the effective optical surface of the lenses hardly deteriorates, and condensation hardly occurs. Light from outside a lens barrel does not enter the effective optical range of the lenses in a lens unit through a communicating passage, and is not diffused much or not diffused at all on the lens surface. Thus, it is possible to avoid an adverse effect of flare, and optical characteristics can be improved and stabilized.

Moreover, the light from outside the lens barrel does not enter the effective optical range even if it enters outside the effective optical range. Therefore, the lens unit can be designed without consideration of part outside the effective optical range. Thus, flexibility in design can be increased.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lens unit comprising:
   a lens barrel that accommodates a plurality of lenses; and
   a communicating passage that communicates between a space formed between two lenses of the plurality of lenses that are consecutively positioned in an axial direction of the lens barrel and outside of the lens barrel, that is arranged in the lens barrel such that light from outside the lens barrel does not enter an effective optical range of the plurality of lenses through the communicating passage, and that is filled with a material that is permeable to air and is not permeable to light.

2. The lens unit according to claim 1, further comprising a partition between inside and outside of the effective optical range.

3. The lens unit according to claim 1, further comprising a light-absorbing portion outside the effective optical range.

4. The lens unit according to claim 1, wherein the communicating passage is bent.

5. The lens unit according to claim 1, wherein the material is a sponge that passes air therethrough and prevents passage of light.

6. The lens unit according to claim 1, wherein the communicating passage includes an inner periphery that is light-absorbing and antireflective of light.

7. A lens unit comprising:
a lens barrel that accommodates a plurality of lenses; and
a communicating passage that communicates between a space formed between two lenses of the plurality of lenses that are consecutively positioned in an axial direction of the lens barrel and outside of the lens barrel, that is arranged in the lens barrel such that light from outside the lens barrel does not enter the lenses through the communicating passage, and that is filled with a material that is permeable to air and is not permeable to light.

8. The lens unit according to claim 7, wherein the communicating passage is bent.

9. The lens unit according to claim 7, wherein the material is a sponge that passes air therethrough and prevents passage of light.

10. The lens unit according to claim 7, wherein the communicating passage includes an inner periphery that is light-absorbing and antireflective of light.

11. A lens barrel comprising:
a plurality of lenses; and
a communicating passage that communicates between a space formed between two lenses of the plurality of lenses that are consecutively positioned in an axial direction of the lens barrel and outside of the lens barrel, that is bent, and that is filled with a material that is permeable to air and is not permeable to light.

12. An optical device comprising the lens unit according to claim 1.

13. An optical device comprising the lens unit according to claim 7.

14. An optical device comprising the lens barrel according to claim 11.

15. A scanner comprising an image reading unit that reads an image from an original by a photoelectric transducer, and includes any one of the lens unit according to claim 1, and a lens barrel that accommodates a plurality of lenses and includes a bent communicating passage that communicates between a space between the lenses and outside of the lens barrel.

16. A scanner comprising an image reading unit that reads an image from an original by a photoelectric transducer, and includes any one of the lens unit according to claim 7, and a lens barrel that accommodates a plurality of lenses and includes a bent communicating passage that communicates between a space between the lenses and outside of the lens barrel.

17. An image forming apparatus comprising an image reading unit that reads an image from an original by a photoelectric transducer, and includes any one of the lens unit according to claim 1, and a lens barrel that accommodates a plurality of lenses and includes a bent communicating passage that communicates between a space between the lenses and outside of the lens barrel.

18. An image forming apparatus comprising an image reading unit that reads an image from an original by a photoelectric transducer, and includes any one of the lens unit according to claim 7, and a lens barrel that accommodates a plurality of lenses and includes a bent communicating passage that communicates between a space between the lenses and outside of the lens barrel.

19. The lens unit according to claim 1, wherein the two lenses of the plurality of lenses are fixed relative to each other in the axial direction of the lens barrel.

20. The lens unit according to claim 7, wherein the two lenses of the plurality of lenses are fixed relative to each other in the axial direction of the lens barrel.

21. The lens barrel according to claim 11, wherein the two lenses of the plurality of lenses are fixed relative to each other in the axial direction of the lens barrel.

* * * * *